US011973404B2

(12) United States Patent
Yamazaki

(10) Patent No.: US 11,973,404 B2
(45) Date of Patent: Apr. 30, 2024

(54) GAS ENGINE POWER GENERATION SYSTEM

(71) Applicant: Rise Pit Company Co., Ltd., Tokyo (JP)

(72) Inventor: Takahiro Yamazaki, Tokyo (JP)

(73) Assignee: RISE PIT COMPANY CO., LTD., Tokyo (JP)

( * ) Notice: Subject to any disclaimer, the term of this patent is extended or adjusted under 35 U.S.C. 154(b) by 22 days.

(21) Appl. No.: 17/913,049

(22) PCT Filed: Mar. 25, 2021

(86) PCT No.: PCT/JP2021/012595
§ 371 (c)(1),
(2) Date: Sep. 20, 2022

(87) PCT Pub. No.: WO2021/193836
PCT Pub. Date: Sep. 30, 2021

(65) Prior Publication Data
US 2023/0131144 A1 Apr. 27, 2023

(30) Foreign Application Priority Data

Mar. 26, 2020 (JP) ................................. 2020-056787
Dec. 18, 2020 (JP) ................................. 2020-210747

(51) Int. Cl.
*H02K 7/18* (2006.01)
*F02B 63/04* (2006.01)
*F02D 29/06* (2006.01)

(52) U.S. Cl.
CPC ......... *H02K 7/1815* (2013.01); *F02B 63/042* (2013.01); *F02D 29/06* (2013.01)

(58) Field of Classification Search
CPC ..... H02K 7/1815; F02B 63/042; F02D 29/06; F02D 31/001; H02J 3/46
See application file for complete search history.

(56) References Cited

U.S. PATENT DOCUMENTS 3,016,739 A * 1/1962 Jonach ................ G01M 15/044
73/116.05
5,991,683 A * 11/1999 Takaoka ................ B60W 20/00
903/905

(Continued)

FOREIGN PATENT DOCUMENTS

DE 112021001853 T5 * 1/2023 .............. F02B 63/04
GB 2608057 A * 12/2022 .............. F02B 63/04

(Continued)

OTHER PUBLICATIONS

International Search Report (ISR) (PCT Form PCT/ISA/210), in PCT/JP2021/012595, dated Jun. 15, 2021.

(Continued)

*Primary Examiner* — Pedro J Cuevas
(74) *Attorney, Agent, or Firm* — MCGINN I.P. LAW GROUP, PLLC

(57) ABSTRACT

A gas engine power generating system includes an electricity generating component including a gas engine, an alternating-current electricity generator, a cooling system portion, an exhaust system portion, an engine control unit, a battery, and an alternating current/direct current inverter, and a housing. A plurality of the electricity generating components are provided as electricity generating units, and are accommodated in the housing. Each electricity generating unit is configured to be capable of generating electricity independently, the plurality of electricity generating units are electrically connected together in parallel, operation, shut-down, and the amount of generated electric power for all the electricity generating units are managed by a total control unit, and direct-current power from each electricity generating unit is aggregated and converted to alternating-current power, and is supplied to the load side.

18 Claims, 12 Drawing Sheets

(56) References Cited

U.S. PATENT DOCUMENTS

| | | | | |
|---|---|---|---|---|
| 6,278,195 | B1* | 8/2001 | Yamaguchi | B60K 6/445 |
| | | | | 903/910 |
| 8,666,578 | B2* | 3/2014 | Kim | B60W 10/08 |
| | | | | 701/123 |
| 9,944,299 | B2* | 4/2018 | Donnelly | H02P 5/68 |
| 10,110,010 | B2* | 10/2018 | Lucas | H02J 3/46 |
| 10,541,538 | B2* | 1/2020 | Maedako | H02P 25/22 |
| 10,919,412 | B2* | 2/2021 | Sondur | B61C 7/04 |
| 10,992,136 | B2* | 4/2021 | Lucas | H02J 3/46 |
| 11,539,214 | B2* | 12/2022 | Lucas | H02J 3/18 |
| 2014/0039708 | A1* | 2/2014 | Curtis | F25B 27/00 |
| | | | | 290/2 |
| 2015/0318705 | A1* | 11/2015 | Lucas | H02J 3/48 |
| | | | | 307/129 |
| 2016/0114814 | A1* | 4/2016 | Donnelly | B61C 3/00 |
| | | | | 290/3 |
| 2018/0287393 | A1* | 10/2018 | Maedako | H02P 9/02 |
| 2019/0052083 | A1* | 2/2019 | Lucas, Jr. | H02J 3/46 |
| 2020/0094690 | A1* | 3/2020 | Sondur | B60L 1/003 |
| 2021/0305813 | A1* | 9/2021 | Lucas | H02J 3/18 |
| 2023/0198267 | A1* | 6/2023 | Lucas | H02J 13/00002 |
| | | | | 307/151 |

FOREIGN PATENT DOCUMENTS

| | | |
|---|---|---|
| JP | S61-025547 U | 2/1986 |
| JP | H02-262846 A | 10/1990 |
| JP | H09-195811 A | 7/1997 |
| JP | 2018-204594 A | 12/2018 |
| JP | 2019-216579 A | 12/2019 |
| WO | WO 2012/111706 A1 | 8/2012 |
| WO | WO-2021193836 A1 * | 9/2021 ............. F02B 63/04 |

OTHER PUBLICATIONS

English Translation of Japanese Notice of Reasons for Refusal, dated Jun. 22, 2020, in Japanese Application No. 2020-056787.

* cited by examiner

Fig.5A
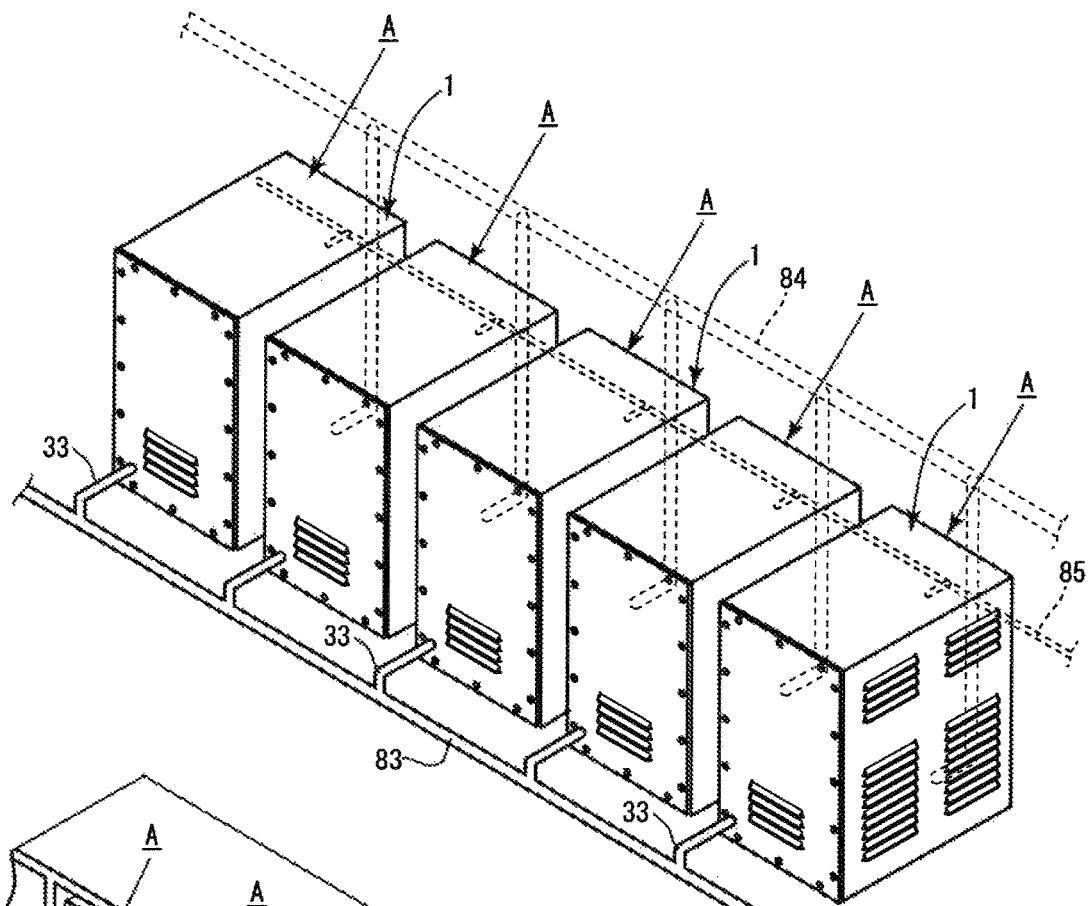
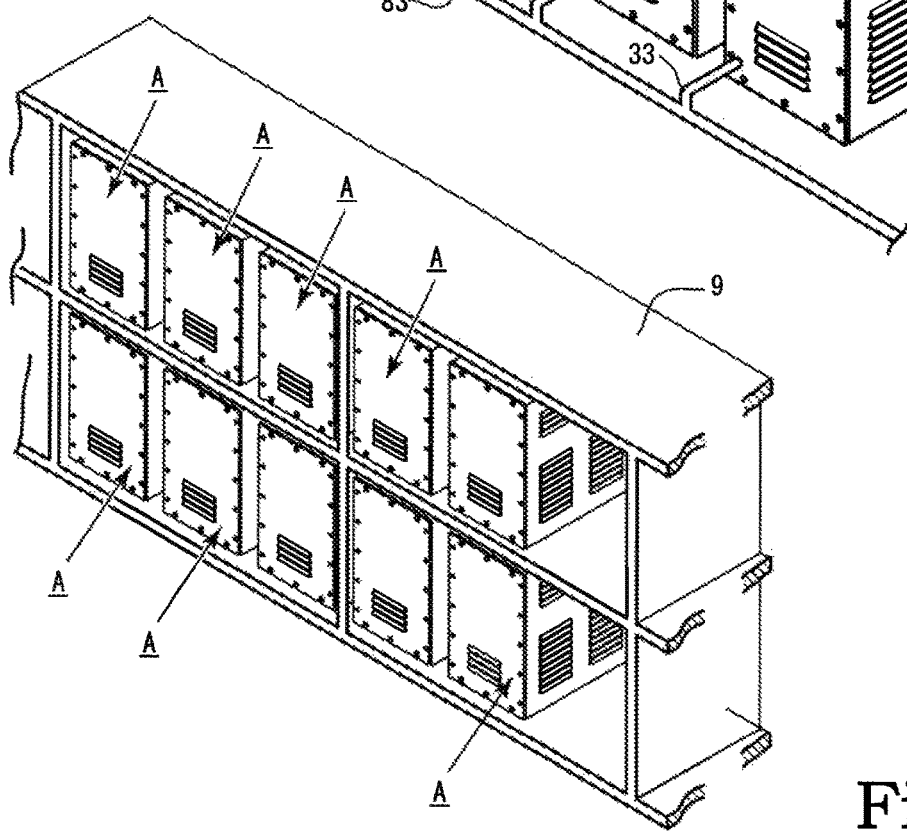
Fig.5B

Fig.7A
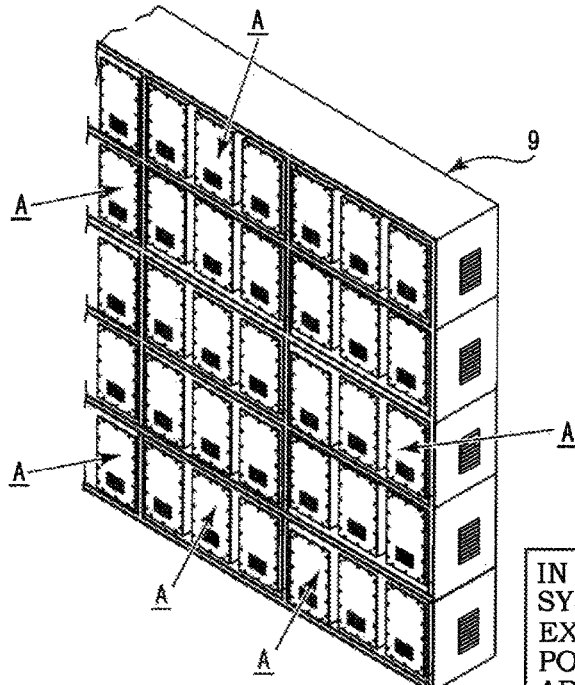
IN DRAWING, PIPING AND WIRING SYSTEM SUCH AS FUEL PIPING, EXHAUST COLLECTING PIPE, POWER CABLE, AND SIGNAL LINE ARE OMITTED
TAKEN ALONG ARROWS Y1-Y1
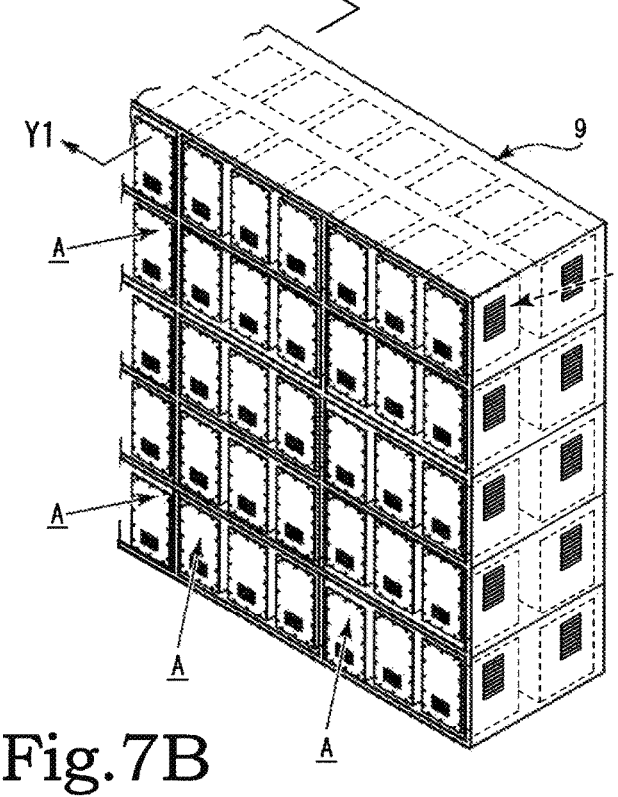
Fig.7B
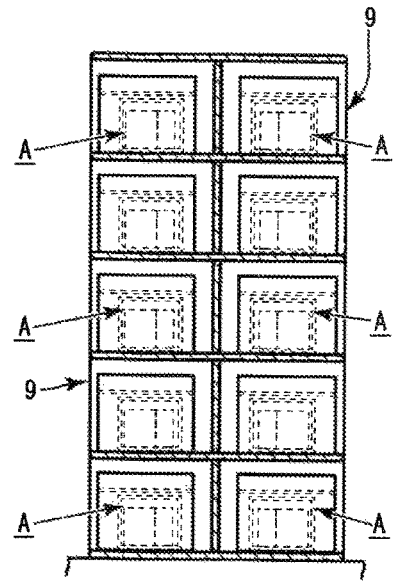
Fig.7C Fig.8A
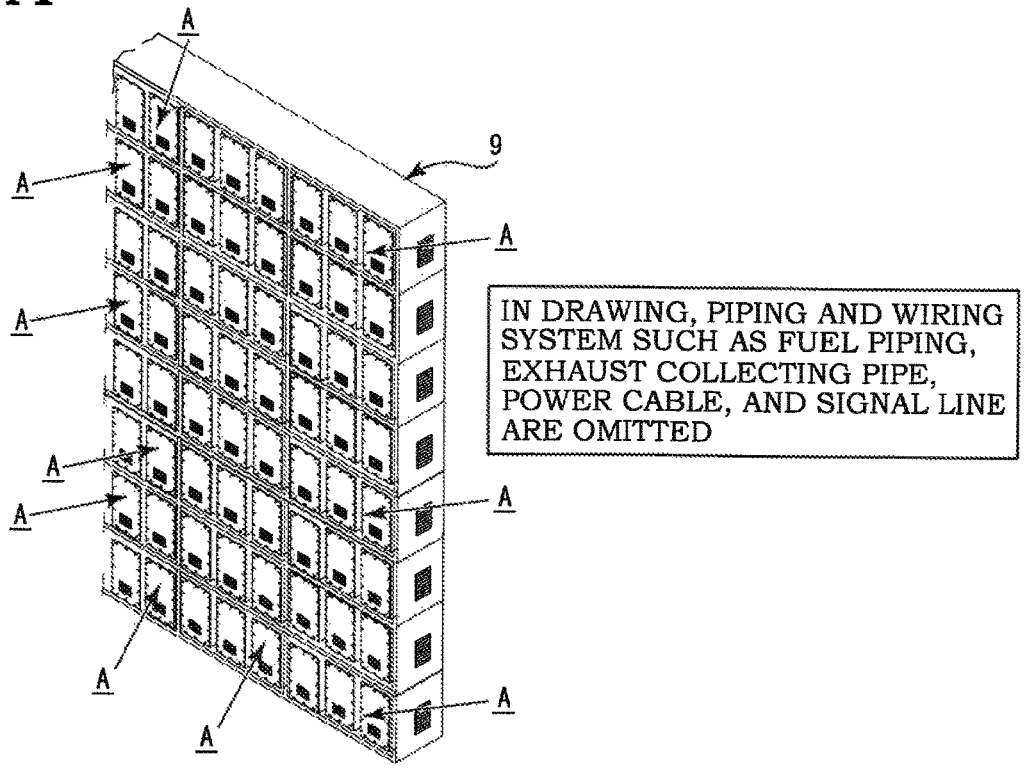
IN DRAWING, PIPING AND WIRING SYSTEM SUCH AS FUEL PIPING, EXHAUST COLLECTING PIPE, POWER CABLE, AND SIGNAL LINE ARE OMITTED
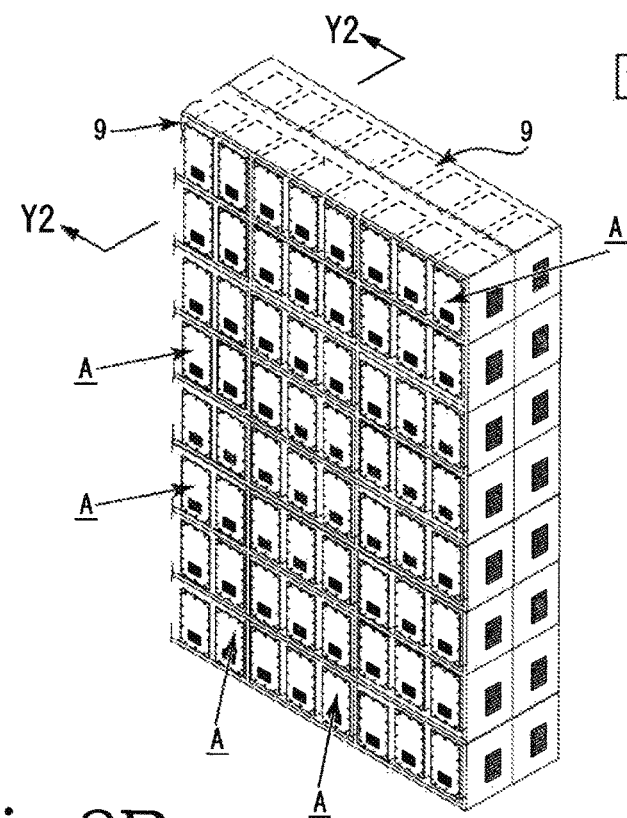
Fig.8B
TAKEN ALONG ARROWS Y2-Y2
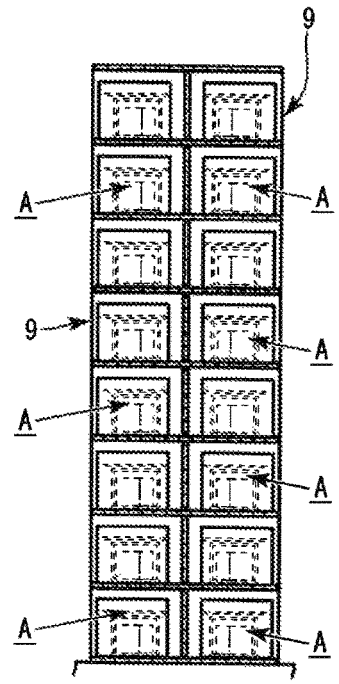
Fig.8C

GAS ENGINE POWER GENERATION SYSTEM

TECHNICAL FIELD

The present invention relates to a gas engine power generation system in which maintenance and management are easily performed, electric power can be supplied efficiently with a small fuel consumption correspondingly to demand for electric power, and, in particular, large electric power can be supplied by coupling a large number of the gas engine power generation systems to each other.

BACKGROUND ART

Conventionally, in an engine generator, it is common to supply required electric power by driving a generator with a plurality of automobile engines or marine diesel engines and electrically coupling the generators in parallel. In addition, with regard to fuel, city gas which allows constant supply of gas only with piping is present. Further, there are cases where LPG (liquefied petroleum gas) which can be easily transported with a cylinder as fuel for emergency and has especially low degradation caused by aging is used. There is a system which drives a generator with such a gas engine. According to this, the number of hydrogen atoms in a molecule of fuel is more than that of gasoline or light oil, and hence the gas engine has advantages that emission of carbon dioxide which is considered to be one of causes for global warming is low, and the gas engine is quiet and has good startability at low temperatures as compared with a diesel engine.

CITATION LIST

Patent Literature

[PTL 1] Japanese Patent Application Publication No. H02-262846
[PTL 2] Japanese Patent Application Publication No. H09-195811
[PTL 3] Japanese Patent Application Publication No. 2018-204594

SUMMARY OF INVENTION

Technical Problem

Incidentally, in a gas engine which is a displacement piston engine, when the gas engine is operated with a constant RPM and a constant air-fuel ratio, thermal efficiency is low when a load is small. In idling, thermal efficiency is zero. That is, it follows that the engine does not do work on the outside and only consumes fuel.

On the other hand, in a spark ignition engine, flame propagation serves as a constraint, and the volume of one cylinder is limited. For information, in a compression ignition diesel engine, the limitation is mild, and one marine diesel engine can generate an output of several tens of thousands of kilowatts. However, the gas engine generates several hundred kilowatts. An electrical load of individual power generation is from zero to about 500 kilowatts. In addition, there are cases where one engine cannot supply the maximum required electric power. In these cases, electric power needs to be extracted by disposing engine generators each having a pair of an engine and a generator in parallel.

When required electric power is small, it follows that a large engine is operated at a low output. In this case, a throttle opening is reduced and thermal efficiency deteriorates. To cope with this, when the required electric power is small, the number of engines to be used is minimized and the output of one engine is increased. When the required electric power is increased, it is preferable to operate engines of which the number corresponds to the increased required electric power. However, when a required electrical load is suddenly increased, another engine has to be started hurriedly, but the engine needs warming-up time.

A cold engine has harmful influences in which combustion in a cylinder is poor and friction loss is large, and hence it is not easy to obtain an output, and white smoke is generated and oil consumption is increased by an oil leak in which oil enters a combustion chamber due to a large gap between a piston and a cylinder.

In each of PTL 1 (Japanese Patent Application Publication No. H02-262846), PTL 2 (Japanese Patent Application Publication No. H09-195811), and PTL 3 (Japanese Patent Application Publication No. 2018-204594), an apparatus in which a plurality of engines and generators are disposed in parallel is present and, in the apparatus, all of the engines are constantly operated, and the operation of the engines does not change in response to an increase or decrease in required electric power.

As described thus far, in a power generation system by gas engines, the individual gas engines and generators operate correspondingly to the increase or decrease in required electric power independently of each other, and a plurality of the gas engines include a gas engine which is operated and a gas engine which is stopped. In addition, even during the operation of the gas engine, a difference in the RPM of the gas engine is present and use conditions differ. As a result, variations occur in timing at which a plurality of the gas engines malfunction. In such a situation, easy maintenance and management of the gas engine, the generator, and parts associated with the gas engine and the generator is an important requirement. To cope with this, an object (a technical problem to be solved) of the present invention is to provide a gas engine power generation system which facilitates maintenance and management and can operate constantly in an optimum state in a power generation system including a plurality of gas engines and generators.

Solution to Problem

Accordingly, in order to solve the above problem, as a result of conducting elaborate studies by the inventors, a first aspect of the present invention is a gas engine power generation system including: a power generation structure constituted by a gas engine, an AC generator, a cooling system portion, an engine control unit, and an AC-DC converter; and a cabinet, wherein the power generation structure is housed in the cabinet and is unitized into a power generation unit, a plurality of the power generation units which have the same configuration and compatibility are provided, the individual power generation units are configured to be able to generate electric power independently of each other, the plurality of the power generation units are electrically coupled to each other in parallel, operation and stopping of all of the power generation units and a magnitude of generated electric power are managed by a total control unit, DC power from the individual power generation units is totalized and converted to AC power, the AC power is supplied to a load side as the AC power, the engine control unit performs control by adjusting a throttle opening such that an RPM of the gas engine becomes constant against a load of power generation of the gas engine, a frame in which the gas engine and the AC generator are installed is provided in the cabinet, and the frame in which the gas engine and the AC generator are installed is configured to be able to be taken out from and be put in the cabinet, whereby the above problem is solved.

A second aspect of the present invention is a gas engine power generation system including: a power generation structure constituted by a gas engine, a DC generator, a cooling system portion, and an engine control unit; and a cabinet, wherein the power generation structure is housed in the cabinet and is unitized into a power generation unit, a plurality of the power generation units which have the same configuration and compatibility are provided, the individual power generation units are configured to be able to generate electric power independently of each other, the plurality of the power generation units are electrically coupled to each other in parallel, operation and stopping of all of the power generation units and a magnitude of generated electric power are managed by a total control unit, DC power from the individual power generation units is totalized and converted to AC power, the AC power is supplied to a load side as the AC power, the engine control unit performs control by adjusting a throttle opening such that an RPM of the gas engine becomes constant against a load of power generation of the gas engine, a frame in which the gas engine and the DC generator are installed is provided in the cabinet, and the frame in which the gas engine and the DC generator are installed is configured to be able to be taken out from and be put in the cabinet, whereby the above problem is solved.

A third aspect of the present invention is the gas engine power generation system according to the first or second aspect, wherein fuel supply in all of the power generation units is performed in fuel piping provided outside the power generation units, whereby the above problem is solved. A fourth aspect of the present invention is the gas engine power generation system according to any one of the first, second, and third aspects, wherein exhaust of all of the power generation units is performed by connection with an exhaust duct provided outside the power generation units, whereby the above problem is solved. A fifth aspect of the present invention is the gas engine power generation system according to any one of the first, second, third, and fourth aspects, further including: a unit rack, wherein the plurality of the power generation units are disposed in parallel in the unit rack, whereby the above problem is solved.

A sixth aspect of the present invention is the gas engine power generation system according to any one of the first, third, fourth, and fifth aspects, wherein a guide rail is provided on a floor plate of the cabinet, and a guide piece movable along the guide rail is provided on a side of a lower surface of a bottom plate of the frame, whereby the above problem is solved. A seventh aspect of the present invention is the gas engine power generation system according to any one of the first, third, fourth, fifth, and sixth aspects, wherein the cabinet has a vertical two-story structure via an intermediate plate, the frame is housed in a lower room portion, and electrical equipment is housed in an upper room portion, whereby the above problem is solved.

An eighth aspect of the present invention is the gas engine power generation system according to the fifth aspect, wherein the plurality of the power generation units are disposed on two tiers arranged vertically in the unit rack, whereby the above problem is solved. A ninth aspect of the present invention is the gas engine power generation system according to the fifth aspect, wherein the plurality of the power generation units are disposed on three to seven tiers in the unit rack, whereby the above problem is solved. A tenth aspect of the present invention is the gas engine power generation system according to the fifth aspect, wherein the plurality of the power generation units are disposed on eight to ten-odd tiers in the unit rack, whereby the above problem is solved.

Advantageous Effects of Invention

In the first or second aspect of the present invention, by unitizing a plurality of individual power generation apparatuses into a plurality of units, it is possible to facilitate maintenance and management, and it is possible to replace, when one unit has a failure, the entire unit. Further, in the present invention, it is possible to perform efficient and stable electric power supply with the configuration in which the operation and stopping of all of the power generation units and the magnitude of generated electric power are managed by the total control unit.

In the third aspect of the present invention, it is possible to simplify the configuration of the system by performing the fuel supply in all of the power generation units in the fuel piping provided outside the power generation units. In the fourth aspect of the present invention, it is possible to simplify the configuration of the system by connection with the exhaust duct provided outside the power generation units. In the fifth aspect of the present invention, it is possible to efficiently dispose the power generation units by disposing the plurality of the power generation units in parallel in the unit rack, which is suitable particularly for a small machine room.

In the sixth or seventh aspect of the present invention, it is possible to facilitate maintenance and management of the power generation unit and its system. In the eighth aspect of the present invention, it is possible to further improve storage efficiency by disposing the plurality of the power generation units on two tiers arranged vertically in the unit rack.

In the ninth or tenth aspect of the present invention, the plurality of the power generation units are disposed on three to seven tiers or eight to ten-odd tiers in the unit rack, whereby, when the power generation unit is provided in each rack portion and is operated, it is possible to obtain relatively large-capacity power generation capacity and cause the gas engine power generation system to supply an energy demand for a power plant. This has an advantage that it is possible to obtain $CO_2$ emission effect as well.

BRIEF DESCRIPTION OF DRAWINGS

FIG. 5(A) is a perspective view of a principal portion in a state in which a plurality of the power generation units are disposed in parallel, and FIG. 5(B) is a perspective view of a principal portion in a state in which a plurality of the power generation units are installed in a unit rack having two tiers arranged vertically.

FIG. 7(A) is a perspective view of a principal portion in a state in which a large number of the power generation units are installed in a unit rack having five tiers in a vertical direction, FIG. 7(B) is a perspective view of a principal portion in a state in which the five tiers of FIG. 7(A) are arranged in parallel, and FIG. 7(C) is a view taken along the arrows Y1-Y1 in FIG. 7(B).

FIG. 8(A) is a perspective view of a principal portion in a state in which a large number of the power generation units are installed in a unit rack having eight tiers in the vertical direction, FIG. 8(B) is a perspective view of a principal portion in a state in which the eight tiers in FIG. 8(A) are arranged in parallel, and FIG. 8(C) is a view taken along the arrows Y2-Y2 in FIG. 8(B).

DESCRIPTION OF EMBODIMENTS

Figure 1:
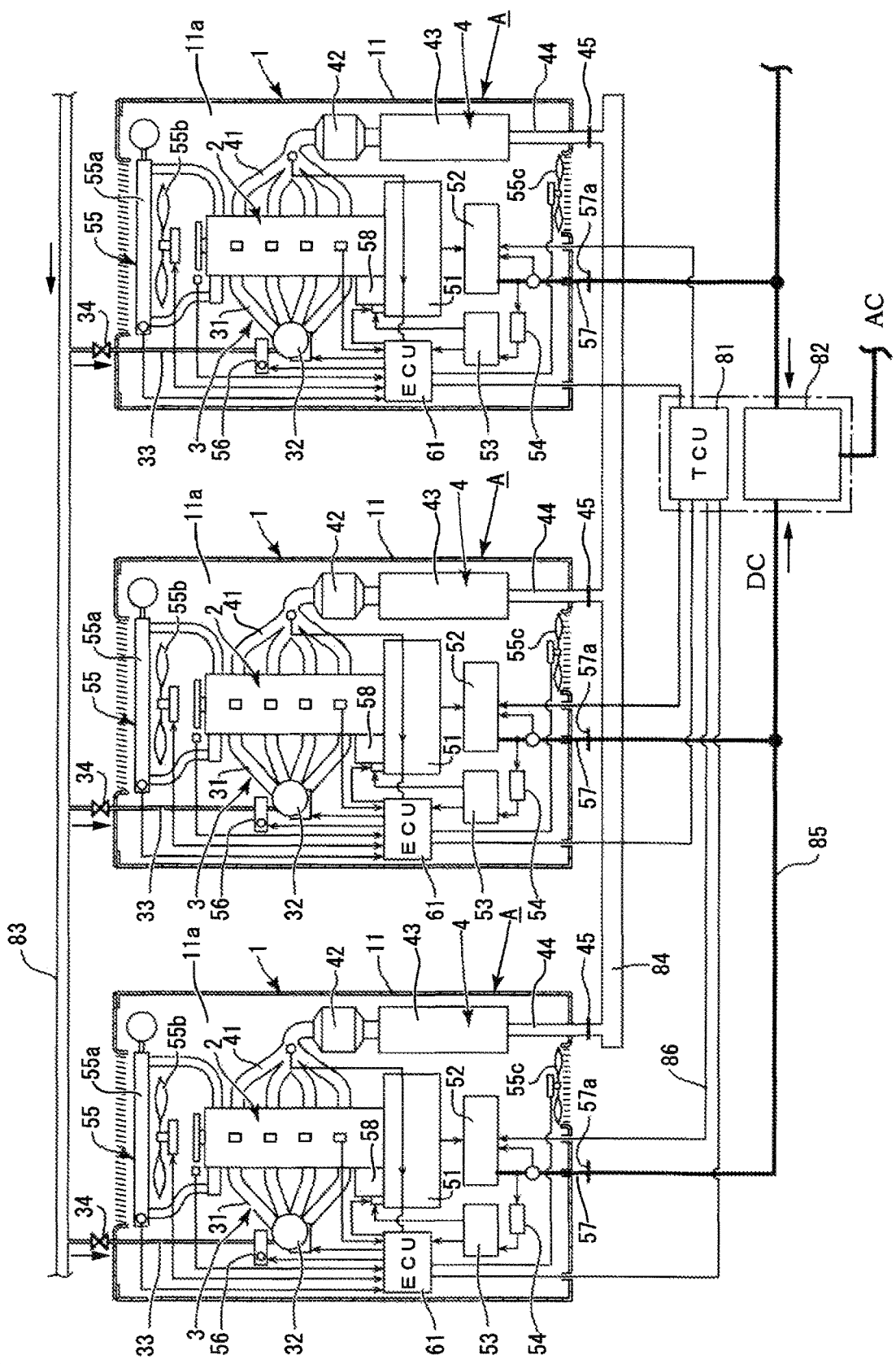
FIG. 1 is a schematic view showing the configuration of the present invention.

An embodiment of the present invention will be described based on the drawings. The overall configuration of the present invention will be described by using FIG. 1. The present invention has a configuration in which a plurality of power generation units A, a total control unit (TCU) 81, a DC-AC inverter 82, fuel piping 91, an exhaust collecting pipe 84, and a power cable 93 are provided. In addition, the power generation unit A includes a gas engine 2, an AC generator 51, an intake system portion 3, an exhaust system portion 4, an engine control unit (ECU) 61, and an AC-DC converter 52 [see FIG. 1 and FIG. 2(A)].

A plurality of the power generation units A are provided, and the plurality of the power generation units A, A, . . . share a common power cable 85, and are electrically disposed in parallel. In addition, the plurality of the power generation units A, A, . . . are coupled to each other so as to share common fuel piping 83 and a common exhaust collecting pipe (may also be referred to as an exhaust duct) 84. That is, the power generation units A, A, . . . share the common fuel piping 83, the common exhaust collecting pipe (may also be referred to as the exhaust duct) 84, and the common power cable 85 outside the power generation units A, A, . . . , and are coupled or connected to each other in parallel.

In addition, the plurality of the power generation units A, A, . . . are controlled by the total control unit (TCU), DC power from the individual power generation units A, A, . . . is totalized and converted to AC power, and required electric power is supplied to a load side. These are installed in a machine room M (see FIG. 2(B)).

First, the power generation unit A will be described. In the power generation unit A, the gas engine 2, the AC generator 51 connected to the gas engine 2, and parts which are essential for operating the gas engine 2 are housed in a cabinet 1 [see FIG. 2(A)]. The parts essential for operating the gas engine 2 include mainly the engine control unit (ECU) 61, a radiator 55a, a cooling fan 55b, and a battery 53.

Figure 3A:
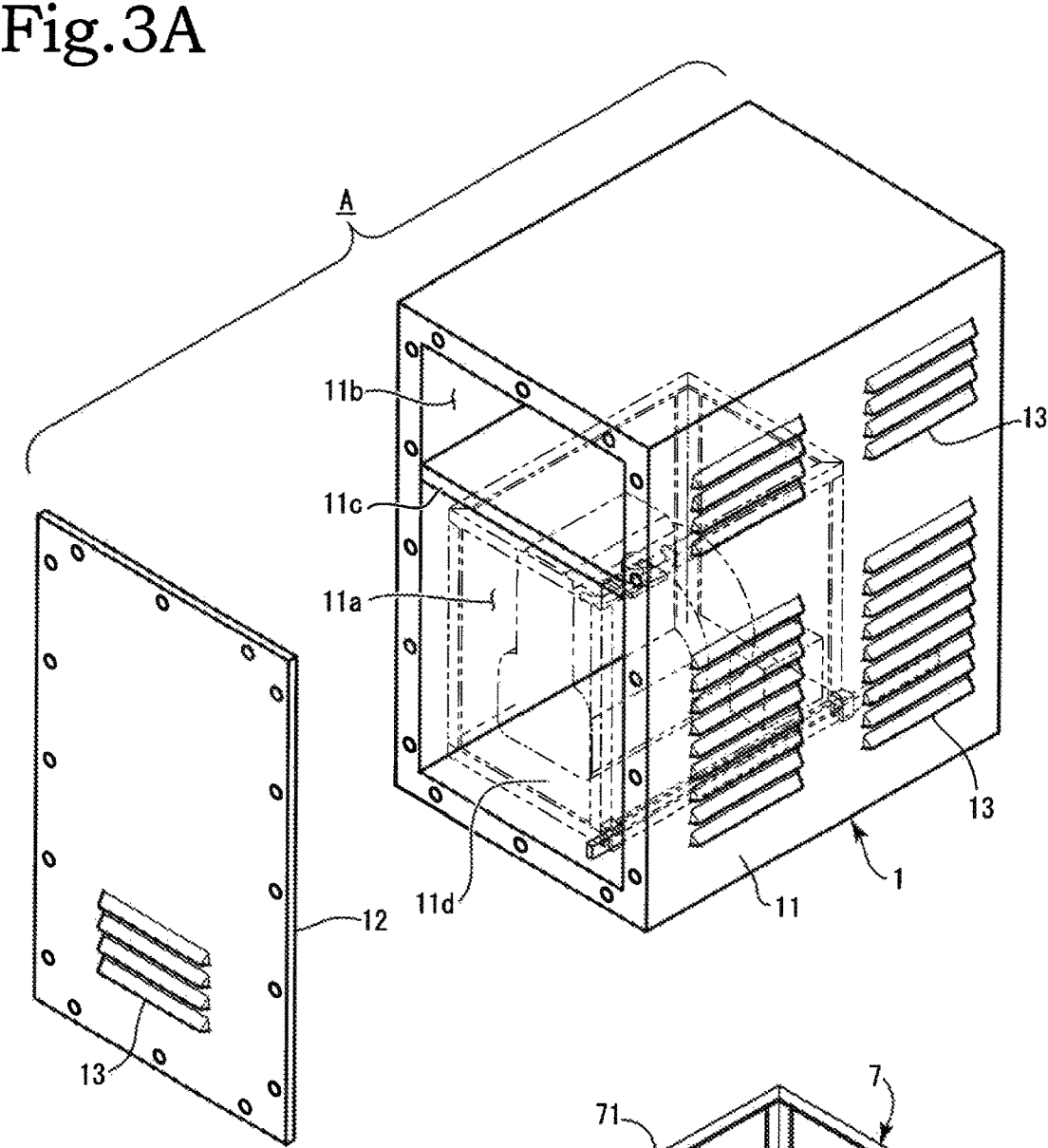
FIG. 3(A) is an exploded perspective view of a cabinet of the power generation unit.
Figure 4A:
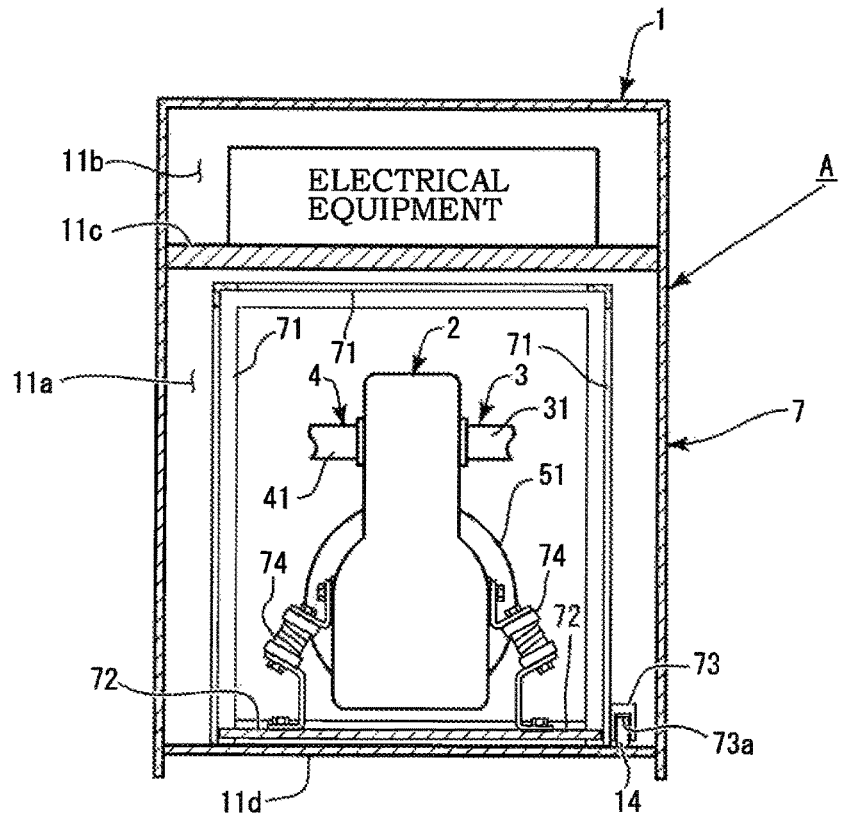
FIG. 4(A) is a longitudinal side schematic view of the power generation unit.
Figure 4B:
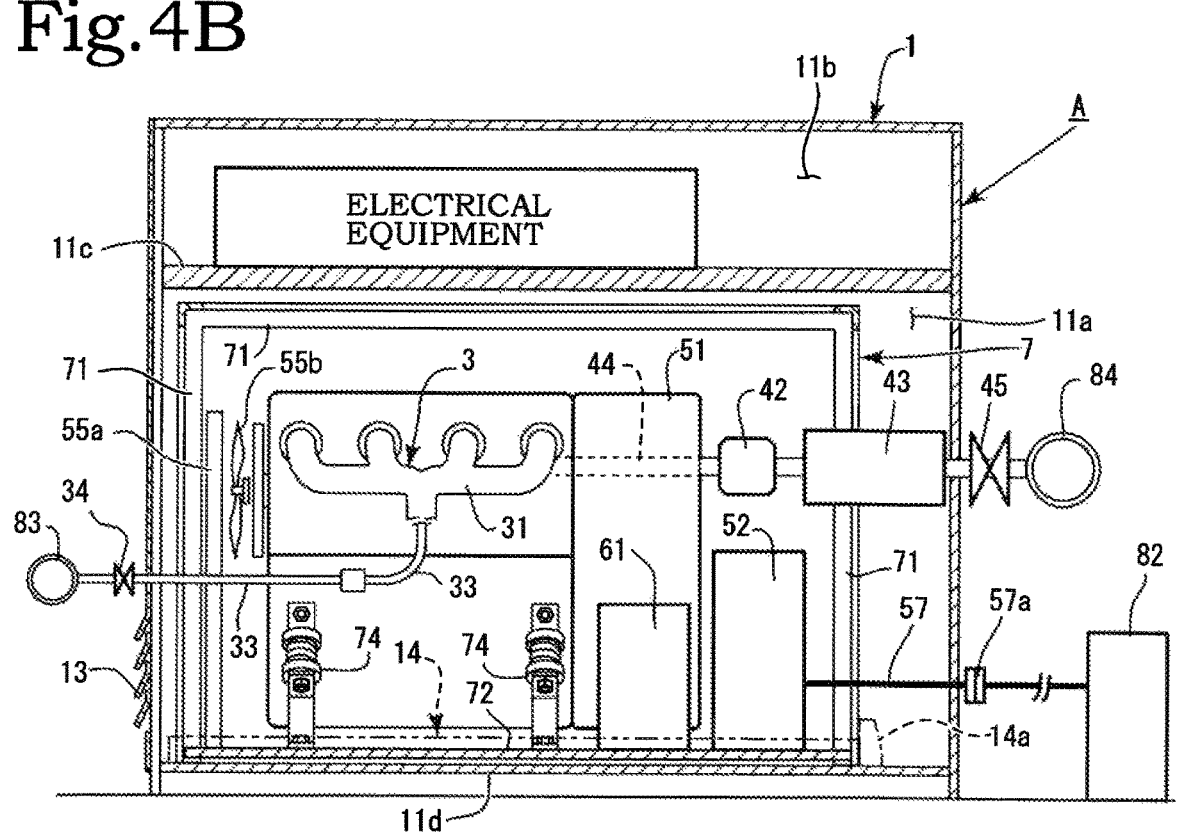
FIG. 4(B) is a longitudinal side schematic view of the power generation unit.

The cabinet 1 is a substantially cuboid housing, and includes a main body portion 11 and a cover portion 12. The main body portion 11 has an engine room 11a in its lower portion, and has an electrical equipment room 11b in its upper portion. The engine room 11a and the electrical equipment room 11b are separated from each other by an intermediate plate 11c [see FIG. 3(A)]. In the engine room 11a, the gas engine 2, the AC generator 51, and a charger 54 are housed (see FIG. 4). In the electrical equipment room 11b, the AC-DC converter 52, the engine control unit (ECU) 61, and electrical equipment related thereto are housed. The front side of the main body portion 11 has an opening, the gas engine 2 and electrical equipment such as the engine control unit (ECU) 61 can be taken out from and be put in the cabinet 1 through the opening for maintenance and management, and maintenance and management can be efficiently performed.

The cover portion 12 plays a role in closing the opening of the main body portion 11, and the cover portion 12 and the main body portion 11 are joined to each other by fixing implements such as a bolt and a screw. A louver 13 is provided in each of the main body portion 11 and the cover portion 12 [see FIG. 3(A)]. The louver 13 plays a role as a ventilating opening, and also plays a role for thermal release.

Figure 3B:
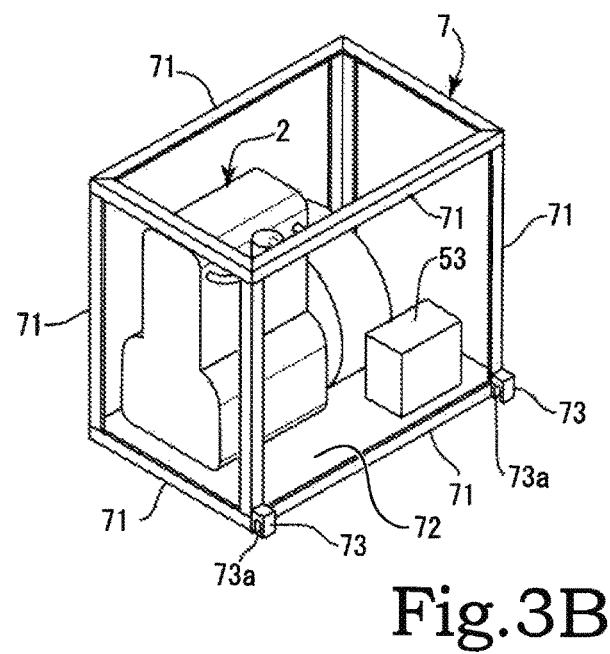
FIG. 3(B) is a perspective view of a frame in which a gas engine and its peripheral equipment of the power generation unit are installed.

The gas engine 2, the AC generator 51, and the charger 54 housed in the engine room 11a are mounted so as to be housed in a frame 7 [see FIG. 3(B) and FIG. 4]. The frame 7 is a framed structure and is formed as a substantially cuboid frame by a plurality of frame members 71, 71, . . . each having an L-shaped cross section. Specifically, twelve frame members 71 are used. The frame members 71 are coupled and fixed to each other by welding or the like. A frame floor plate 72 is provided at a bottom portion of the frame 7, and the gas engine 2, the AC generator 51, and the charger 54 are disposed on an upper surface of the frame floor plate 72 [see FIG. 3(A)].

With regard to the frame members 71, twelve frame members 71 which are independent of each other may be joined to each other by welding, or the number of frame members 71 and the number of welding portions may be reduced by bending part of the frame member 71. Guide pieces 73 are mounted to both side portions on the front and the rear which are in a lower portion of the frame 7 and are on one side in a width direction. The guide pieces 73 are firmly mounted to the lower portion of the frame 7 by welding or fixing means such as a bolt [see FIG. 3(B) and FIG. 4(A)]. The guide piece 73 is formed as a block member in a substantially gate-like shape or fork-like shape, and an inserted portion 73a in an inverted concave shape is formed in a lower portion of the guide piece 73.

In addition, a guide rail 14 is provided on a main body floor plate 11*d* of the main body portion 11 of the cabinet 1. A configuration is adopted in which the guide rail 14 of the frame 7 is inserted and fitted into the inserted portion 73*a* of the guide piece 73, and the guide piece 73 slides along the guide rail 14 [see FIG. 4(A)]. The frame 7 moves to the engine room 11*a* of the main body portion 11 of the cabinet 1 along the guide rail 14, and is inserted to a predetermined position and fixed. At this point, it is possible to install the frame 7 at a predetermined position of the main body floor plate 11*d* of the main body portion 11 with a structure in which the guide piece 73 on both sides in a front-rear direction of the frame 7 and the guide rail 14 of the main body portion 11 are fitted to each other.

The frame 7 is placed on the main body floor plate 11*d* of the main body portion 11 while the movement of the frame 7 in a left-right direction is regulated by the fit between the guide piece 73 and the guide rail 14 of the main body portion 11, and is thereby prevented from being moved by vibrations and displaced from the predetermined position. In addition, the gas engine 2 and the AC generator 51 are supported by the frame 7 via a rubber vibration isolator 74. Further, there are cases where parts installed on the main body floor plate 11*d* such as the charger 54 are supported by the rubber vibration isolator 74 on an as needed basis.

A stopper 14*a* is provided at a rear end of the guide rail 14, i.e., a deep-side end of the main body portion 11 of the cabinet 1. In the case where the frame 7 is housed in the main body portion 11 of the cabinet 1, during the movement of the guide piece 73 along the guide rail 14, when the frame 7 reaches the predetermined position of the main body portion 11, the guide piece 73 on a deep side of the frame 7 comes into contact with the stopper 14*a*, and the frame 7 can stop at a proper position in the cabinet 1 [see FIG. 4(B)].

Thus, the position of the frame 7 in the left-right direction is determined by the guide piece 73 and the guide rail 14, a depth direction of the cabinet 1 is determined by the stopper 14*a*, and, herein, the frame 7 is fixed to the main body portion 11 by a retainer nut and a bolt 46. A configuration is adopted in which the frame floor plate 72 of the frame 7 is provided on an entire surface in the lower portion of the frame 7, but the configuration is not limited to such a configuration, and a configuration may also be adopted in which the frame floor plate 72 is provided to be formed into a beam-like shape so as to partially form a bridge.

Figure 2A:
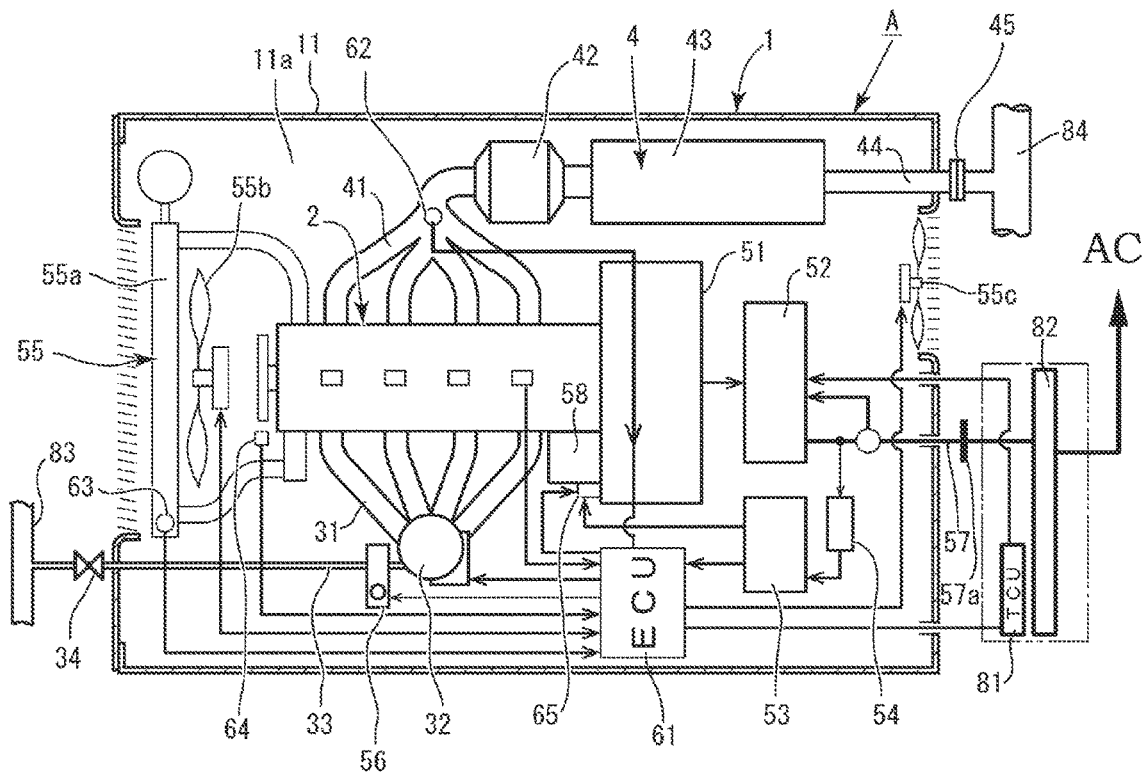
FIG. 2(A) is an enlarged view of a power generation unit.
Figure 2B:
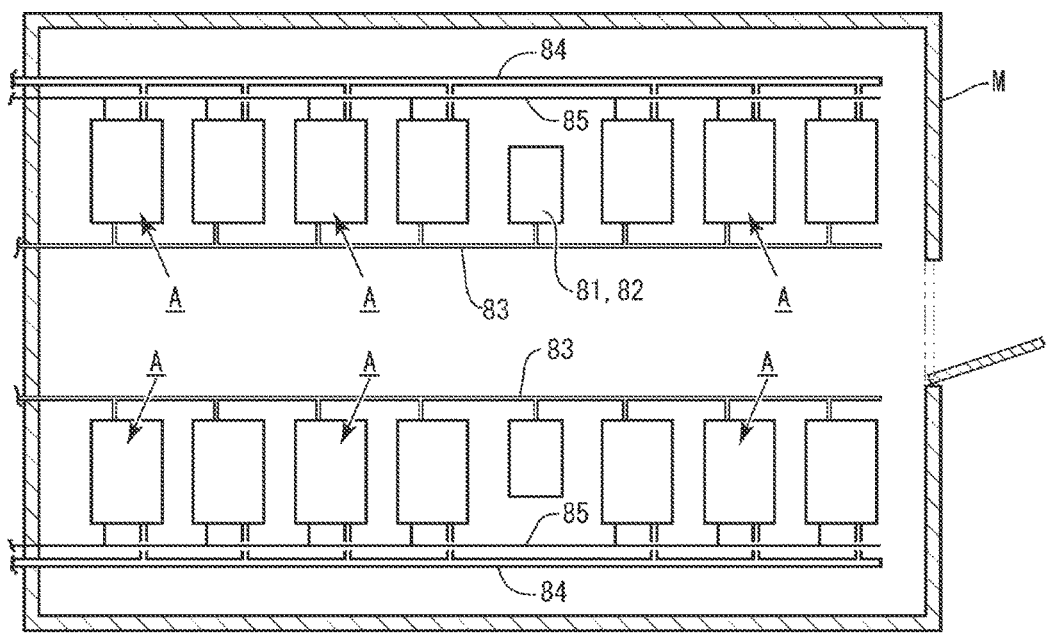
FIG. 2(B) is a schematic view showing a state in which a plurality of the power generation units are installed in a machine room.

In the gas engine 2, the intake system portion 3 and the exhaust system portion 4 are provided [see FIG. 1 and FIG. 2(A)]. Further, an intake manifold 31 and an exhaust manifold 41 are provided in the intake system portion 3 and the exhaust system portion 4, a mixer 32 is provided in the intake manifold 31, and an internal fuel supply pipe 33 is further provided continuously. The internal fuel supply pipe 33 protrudes to the outside of the cabinet 1, and a shut-off valve 34 is provided in a portion of the internal fuel supply pipe 33 which protrudes to the outside of the cabinet 1 [see FIG. 2(A)].

A three-way catalyst 42 and a muffler 43 are provided in the exhaust manifold 41, and an internal exhaust pipe 44 is further provided continuously. The internal exhaust pipe 44 protrudes to the outside of the cabinet 1, and an intake joint portion 45 is provided in a portion of the internal exhaust pipe 44 which protrudes to the outside of the cabinet 1 [see FIG. 2(A)].

In addition, in the AC generator 51, an output electric wire 57 is provided continuously from the AC-DC converter 52. The output electric wire 57 protrudes to the outside of the cabinet 1, and a connector 57*a* is provided at a tip of a protruding portion [see FIG. 4(B)]. Into the cabinet 1, sensors such as a water temperature sensor 63, a crank sensor 64, and an $O_2$ sensor 62 are incorporated. In addition, a radiator, a cooling fan 55*b* and the like are provided [see FIG. 2(A)].

Thus, the power generation units A have exactly the same configuration, and hence compatibility can be provided between the individual power generation units A. Even in the case where a failure occurs in any power generation unit A, it is possible to recover from the failure with a minimum reduction in power generation capacity in a short time period by replacing the power generation unit A with a new power generation unit A.

The AC generator 51 is driven by the operation of the gas engine 2, AC generated by the AC generator 51 is converted to DC having a predetermined voltage by the AC-DC converter 52, and electric power by the DC is output. Components required for the operation of the gas engine 2 such as, e.g., the engine control unit (ECU) 61, the battery 53, the radiator 55*a*, the cooling fan 55*b*, and a cabinet ventilation fan 55*c* are housed in the cabinet 1 to constitute each power generation unit A.

With this, when fuel is supplied to the individual power generation units A, it becomes possible for the power generation units A to operate the gas engines 2 independently of each other to generate electric power. The operation of the individual power generation units A is performed with a command from the total control unit (TCU) 81 which is provided independently of all of the power generation units A to the engine control units (ECU) 61 in the power generation units A.

DC power from the individual power generation units A is collected in the DC-AC inverter 82 provided independently of all of the power generation units A, and the DC power is supplied to the load side as AC having a predetermined voltage and a predetermined frequency [see FIG. 1 and FIG. 2(A)]. Electric output allocated to each power generation unit A by the DC-AC inverter 82 is monitored by an ammeter or a voltmeter.

When the DC-AC inverter 82 attempts to output a predetermined voltage, a current is reduced and the engine control unit (ECU) 61 determines that electric power allocated by the total control unit (TCU) 81 is not output, and a throttle actuator opens a throttle. With this, torque of the engine is increased. Thus, the output of the engine proportional to (RPM)×(torque) is increased by increasing the torque while maintaining the engine RPM at a constant level (e.g., 2400 rpm).

In addition, if the DC-AC inverter 82 is set so as to output a predetermined current value, the output of the gas engine 2 is small and a predetermined RPM is not reached, and a current or a voltage measured by an ammeter or a voltmeter is reduced. In order to make up for the reduction, the DC-AC inverter 82 outputs a signal to the throttle actuator such that the throttle is opened. With this, the RPM of the gas engine 2 is configured to be the constant RPM.

Thus, the individual power generation units A can generate electric power independently of each other, and DC power (DC power obtained by parallel addition) allocated by the total control unit (TCU) 81 is converted in the DC-AC inverter 82 which collectively converts overall DC to AC, and AC power having a predetermined voltage is transmitted. The individual power generation units A are coupled to each other by the fuel piping 83, the power cable 85 for DC output, and a signal line 86 from the total control unit (TCU) 81.

Exhaust which is discharged from each gas engine 2 through the three-way catalyst 42 and the muffler 43 may be released directly into the air individually or may also be collected by the exhaust collecting pipe (exhaust duct) 84 and then released into the air. The $O_2$ sensor 62 is mounted to the exhaust manifold 41 and, with a signal of the $O_2$ sensor 62, the engine control unit (ECU) 61 controls a low-pressure control valve 56 such that the air-fuel ratio matches the theoretical air-fuel ratio (15.6 in the case where fuel is propane C3H8 and 16.8 in the case where fuel is city gas 13A). In order to effectively operate the three-way catalyst 42 for making HC, CO, and NOx harmless at the same time, it is essential that the air-fuel ratio of the engine matches the theoretical air-fuel ratio.

The functions of the engine control unit (ECU) 61 include adjusting the throttle opening such that the engine RPM detected by the crank sensor 64 matches a predetermined RPM (e.g., 2400 rpm which is constant), controlling the low-pressure control valve 56 and controlling ignition timing such that the air-fuel ratio detected by the $O_2$ sensor 62 matches the theoretical air-fuel ratio, starting and stopping the gas engine 2, and controlling the electric cooling fan 55*b* and cabinet ventilation fan 55*c*. Herein, with regard to the start of the engine, the engine control unit (ECU) 61 having received a command of the total control unit (TCU) 81 turns on a starter relay 65, and performs the start of the engine with a starter motor 58.

With regard to allocation of a request for generated electric power to each power generation unit, an instruction is issued directly to the AC-DC converter 52 of each power generation unit A from the total control unit (TCU) 81. With this, each engine 2 generates the torque of the engine which drives the AC generator 51 such that the RPM becomes constant against the load of power generation of each engine 2. DC power having the same voltage output by the individual power generation units is converted to AC power having a predetermined voltage and a predetermined frequency in the DC-AC inverter 82, and the AC power is supplied to the load side.

Note that electric power required by each gas engine 2 is supplied from the battery 53. The battery 53 is constantly charged by the charger 54. Note that, herein, in the case where a DC generator is used instead of the AC generator 51, when a current of a field coil is controlled such that electric power having the same voltage is generated, the AC-DC converter 52 becomes unnecessary.

A description will be given of the case where the power generation units are disposed in parallel with FIG. 2. The individual power generation units are coupled to each other by the power cable 85, the signal line 86, the fuel piping 83, and the exhaust collecting pipe 84. This drawing shows an example in which the total control unit (TCU) 81 and the DC-AC inverter 82 are housed in one case (see FIG. 2).

FIG. 5(B) shows a power generation apparatus in which the individual power generation units are housed in a unit rack 9 having two tiers arranged vertically to be made three-dimensional. Further, by coupling the unit racks 9, it is possible to supply large electric power with small space. When described specifically, in the case where each power generation unit generates 50 kW, one unit in the case of the gas engine has a width of about 1.7 m, a depth of about 0.8 m, and a height of about 1.3 m, and hence, when the unit rack 9 having three layers (FIG. 5 shows the case of two layers) is used even in a piece of land of 10 m×10 m, it is possible to house seventy-five power generation units A easily. Electric power generated by this is 50 kW×75 units=3750 kW, i.e., 3.75 MW.

Next, a description will be given of a method for operating the gas engine 2 with the RPM and torque having good thermal efficiency with FIGS. 12(A) and 12(B). A fuel consumption rate (g/kW·h) of the vertical axis denotes an amount (gram) of consumed fuel per hour for generating 1 kW when the engine is operated. When the fuel consumption rate is increased, a fuel consumption is increased, and thermal efficiency deteriorates. In the case of LPG, a calorific value per $m^3$ (a mass of 1.96 kg) is 90.7 Mj (90700 kj). For example, the thermal efficiency in the case where the fuel consumption rate is 200 g/kW·h is determined.

Thermal energy of consumed fuel per hour is $$(90700 \text{ kj}/1.96 \text{ kg}) \times 0.2 \text{ kg} = 9255 \text{ kj} \tag{1}$$

On the other hand, work done in one hour based on this is $$1 \text{ kj/s} \times 3600 \text{ s} = 3600 \text{ kj} \tag{2}$$

Accordingly, the thermal efficiency is (2)/(1)=0.389, i.e., 38.9%.

Figure 12B:
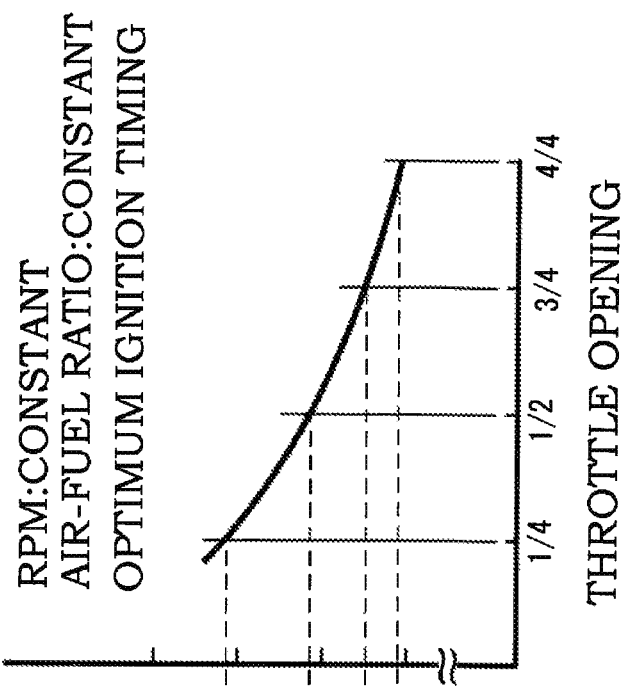
FIG. 12(B) is a table which shows the throttle opening and the burning rate characteristic in the engine RPM having an excellent burning rate in FIG. 12(A).
Figure 12A:
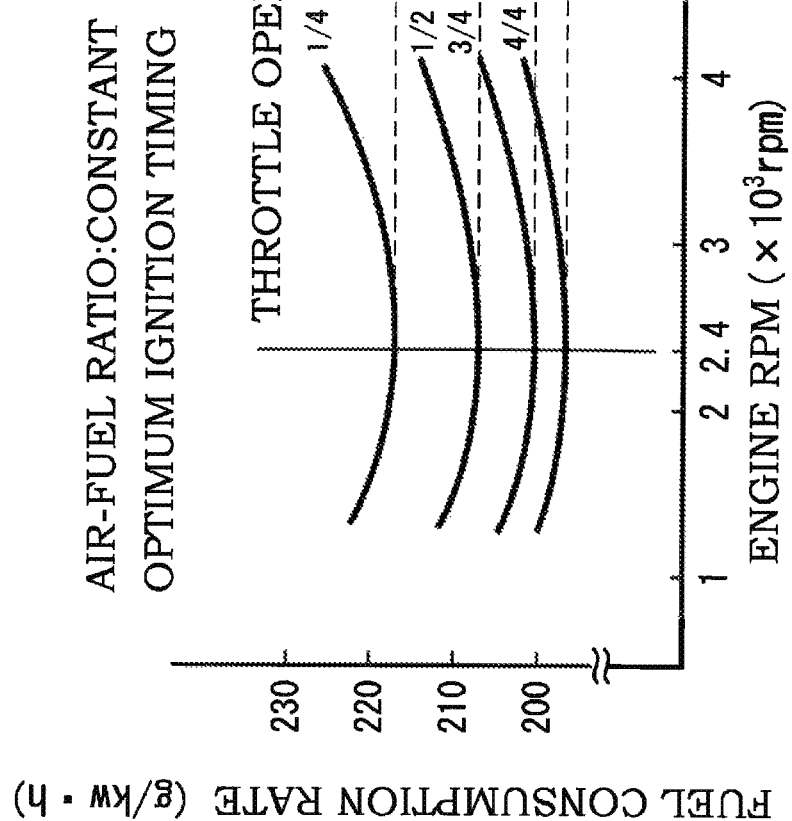
FIG. 12(A) is a table which shows an engine RPM and a burning rate characteristic during operation of an engine by using a throttle opening of the engine as a parameter.

The throttle opening in FIG. 12(B) denotes a value obtained by quartering the throttle opening between 0 and 1 when it is assumed that the fully closed position of the throttle opening is 0 and the fully opened position of the throttle opening is 1 (=4/4). The fuel consumption rate has a curve which is convex downward with respect to the engine RPM. In an example of the gas engine designed for power generation, in each throttle opening, the fuel consumption rate is minimized at the engine RPM of 2400 rpm.

It can be seen that, when the air-fuel ratio is constant, the fuel consumption rate is reduced as the throttle opening is increased. This is because, when the engine RPM is low, flow of a fuel-air mixture in a cylinder is small, and hence combustion is poor and, when the RPM is increased, friction loss is increased, and hence the RPM which minimizes the fuel consumption rate is present even with the same throttle opening. The operation at this engine RPM is advantageous for improving the thermal efficiency.

In addition, as shown in FIG. 12(B), when the throttle opening is increased, the fuel consumption rate is reduced. This is because, although the RPM is constant and the friction loss is almost unchanged accordingly, work done by a piston is increased, and hence a ratio of the friction loss is relatively reduced. Net work obtained by subtracting the friction loss from the work done by the piston is increased. That is, fuel consumption per work is reduced.

When required electric power is small, the small required electric power is handled by opening the throttle to increase torque with a small number of engines. When the required electric power is further increased, the engine control unit (ECU) 61 of each power generation unit operates the engine with a signal from the total control unit (TCU) 81. Note that, in order to cope with a sharp load increase, it is preferable to operate each engine at a throttle opening slightly smaller than the throttle opening of 4/4 (fully opened position) to stay on the safe side.

In this manner, a plurality of the power generation units are selected and operated such that the operation is well-balanced and the thermal efficiency of the engine is optimized for supplying required electric power. Once again, the total control unit (TCU) 81 issues the instruction for economical operation to each power generation unit A.

Thus, the power generation units has exactly the configuration, and hence compatibility can be provided between the individual power generation units A. Even when a failure occurs in any power generation unit, it is possible to recover from the failure with a minimum reduction in power generation capacity in a short time period by replacing the unit. It goes without saying that, when a backup power generation unit is coupled from the beginning, it is possible to avoid an electric power reduction in case of an emergency.

In addition, when at least one engine is operated, it is possible to use the AC generator 51 as the starter motor 58 when another engine is started. In this case, the gas engine 2 is driven with the AC generator 51 with electric power generated by the gas engine 2 which is operated with a signal directly from the total control unit (TCU) 81.

The total control unit (TCU) 81 performs operations such as ignition and throttle opening control required for the operation of the gas engine 2 on the engine control units (ECU) 61 of the gas engines 2 which are started at the same time. By using the generator for the start, the starter motor 58 and the starter relay 65 become unnecessary.

In the present invention, the equipment constituting the power generation system such as the gas engine 2, the AC generator 51, and the engine control unit (ECU) 61 is installed in the cabinet 1, whereby the equipment is unitized into the power generation unit A, a plurality of the power generation units A are provided, and power generation is performed. By unitizing the equipment in this manner, in the case where equipment included in any power generation unit A malfunctions or fails, it is only required that the equipment belonging to the power generation unit A is repaired or replaced, and it is possible to improve working efficiency of maintenance and management.

Figure 6A:
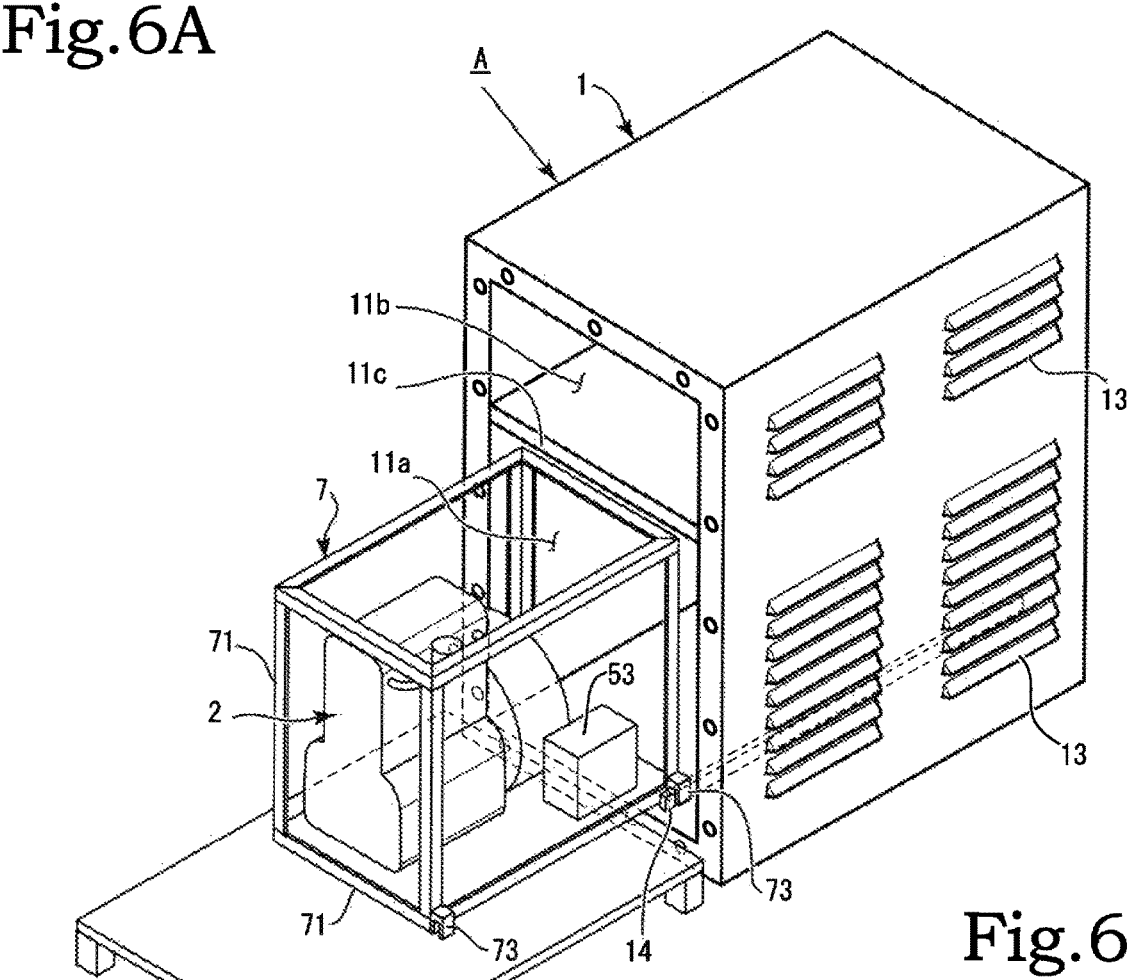
FIG. 6(A) is a perspective view showing a state in which a frame in which the gas engine and an AC generator are installed is drawn onto a pallet from the cabinet of the power generation unit.
Figure 6B:
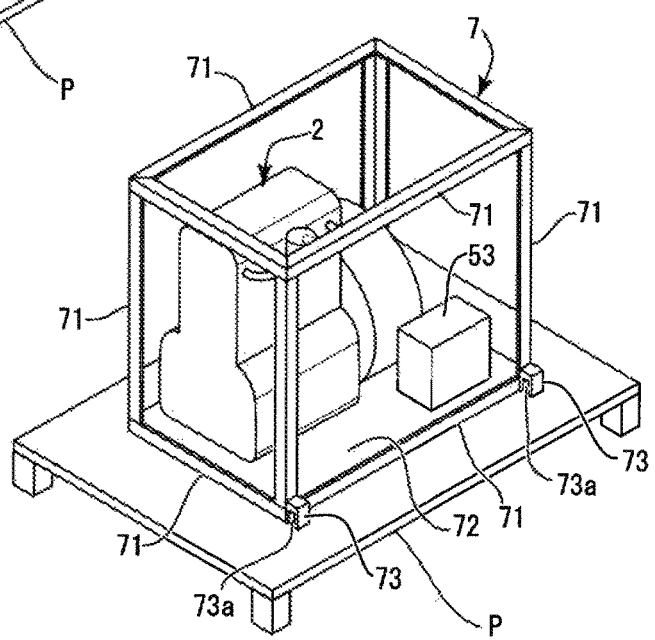
FIG. 6(B) is a perspective view of a state in which the frame is placed on the pallet.

In particular, by the configuration in which heavy equipment such as the gas engine 2 and the AC generator 51 is installed in the frame 7 and the frame 7 can be taken out from and be put in the cabinet 1, maintenance and management and repair are facilitated. Specifically, the cover portion 12 of the cabinet 1 is detached and the pallet P is disposed at the front portion of the opening of the main body portion 11, and the frame 7 drawn from the cabinet 1 is placed on the pallet P, whereby it is possible to transport the frame 7 from the machine room M to the outside easily, and improve efficiency in maintenance and management and repair work (see FIG. 6).

FIG. 7(A) shows a power generation apparatus in which the individual power generation units are housed in the unit rack 9 having five tiers to be made three-dimensional. Further, it is possible to supply large electric power with small space by coupling twenty power generation units on one tier in the unit rack 9. When described specifically, in the case where each power generation unit generates 50 kW, one unit in the case of the gas engine has a width of about 1.7 m, a depth of about 0.8 m, and a height of about 1.3 m, and hence, on the assumption that twenty units are coupled in the width direction, it is possible to install one hundred units in the unit rack 9 having a depth of about 20 m, a width of about 2 m, and a height of about 7.5 m. Electric power generated by this is 50 kW×100 units=5000 kW, i.e., 5 MW.

In addition, a configuration is adopted in which the unit racks 9 in FIG. 7(A) are coupled in parallel (a width of about 4 m) such that the unit racks 9 are less likely to fall, and the individual power generation units A are easily taken out from the left and the right on both sides [FIG. 7(C)]. Generated electric power in this case is 50 kW×200 units=10000 kW, i.e., 10 MW. Further, FIG. 8(A) shows a power generation apparatus in which the individual power generation units are housed in the unit rack 9 having eight tiers arranged vertically to be made three-dimensional. In this case, when it is assumed that each power generation unit A has the above-described size, on the assumption that twenty units are coupled in the width direction, it is possible to install one hundred sixty units in the unit rack 9 having a depth of about 20 m, a width of about 2 m, and a height of about 12 m. Electric power generated by this is 50 kW×160 units=8000 kW, i.e., 8 MW.

Further, a configuration is adopted in which the unit racks 9 in FIG. 8(A) are coupled in parallel (a width of about 4 m) such that the unit racks 9 are less likely to fall, and the individual power generation units A are easily taken out from the left and the right on both sides [FIG. 8(C)]. Generated electric power in this case is 50 kW×320 units=16000 kW, i.e., 16 MW.

Figure 9A:
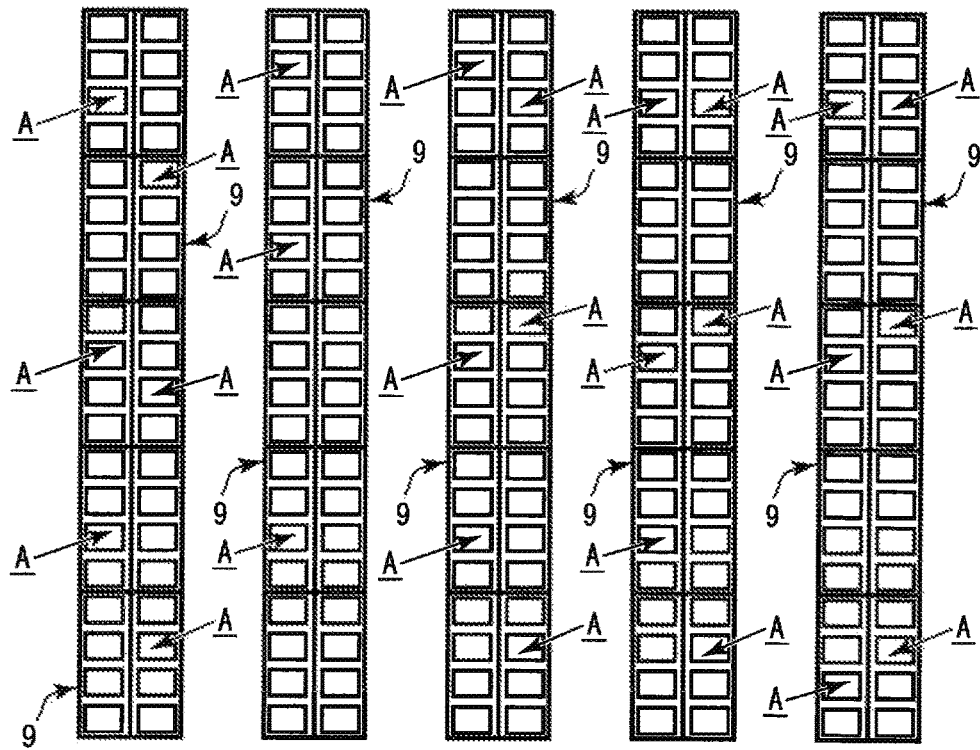
FIG. 9(A) is a plan view of a unit rack group in which unit racks each in a state in which a large number of the power generation units are disposed in parallel on a plurality of tiers in the vertical direction are installed at appropriate intervals.
Figure 9B:
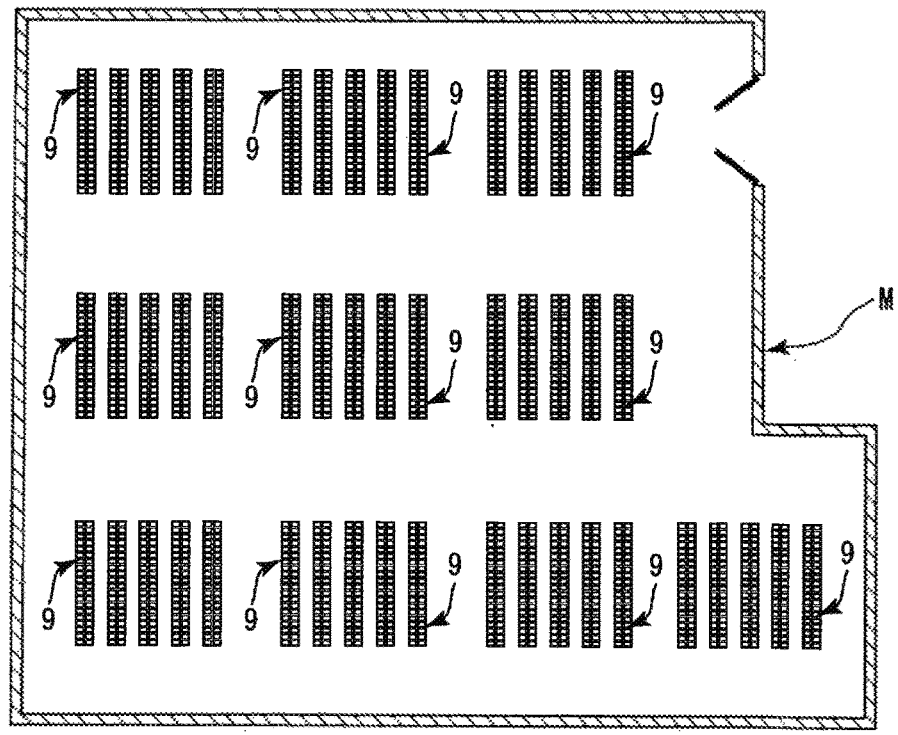
FIG. 9(B) is a plan view in which ten unit rack groups of FIG. 9(A) are arranged.

In addition, FIG. 9(A) shows a configuration in which five sets of groups of the unit racks 9 each having a plurality of tiers shown in FIG. 7 or FIG. 8 are arranged. When the unit rack 9 has five tiers, the number of power generation units A is 1000. Generated electric power in this case is 50 kW×1000 units=50000 kW, i.e., 50 MW=fifty thousand kW. When the unit rack 9 has eight tiers, the number of power generation units A is 1600. Generated electric power in this case is 50 kW×1600 units=80000 kW, i.e., 80 MW=eighty thousand kW.

In addition, a configuration is adopted in which the number of the group sets shown in FIG. 9(A) is increased by ten times. When the unit rack 9 has five tiers, the number of power generation units A is 10000. Generated electric power in this case is 50 kW×10000 units=500000 kW, i.e., 500 MW=five hundred thousand kW. When the unit rack 9 has eight tiers, the number of power generation units A is 16000. Generated electric power in this case is 50 kW×16000 units=800000 kW, i.e., 800 MW=eight hundred thousand kW. Thus, the power generation apparatus which generates five hundred thousand kW or eight hundred thousand kW is exactly a power plant.

Figure 10:
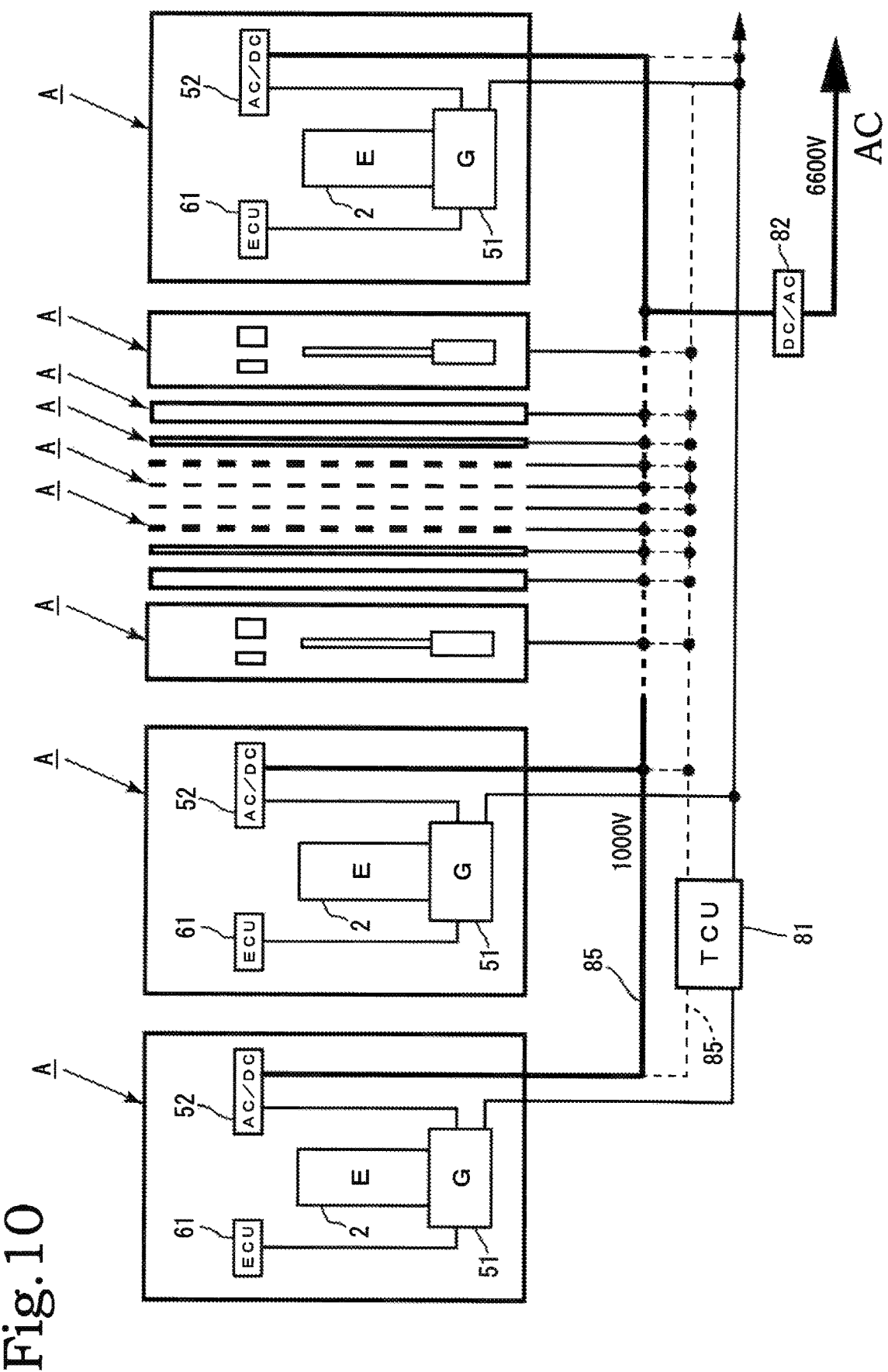
FIG. 10 is a block diagram showing the configuration of the present invention, and is a schematic diagram in which a large number of the power generation units (including AC generators) are used.

A block diagram constituted as described above is as shown in FIG. 10. In this case, in order to generate electric power of five hundred thousand kW (500 MW) obtained collectively from the individual power generation units A, it is necessary to increase the voltage of each power generation unit A. For example, when the voltage is 200 V, if generated electric power is 50 kW, 250 A is obtained. When the voltage is 1000 V, 50 A is obtained and, consequently, it is possible to reduce the thickness of an electric wire. Overall DC power is output at 1000 V in the AC-DC converter 52. DC having 1000 V when the power generation units A are coupled in parallel is converted to AC having a predetermined voltage via the DC-AC inverter 82 with a command from the total control unit (TCU) 81. For example, its output is suitable as three-phase AC having 6600 V in a high-voltage cable of a utility pole.

Figure 11:
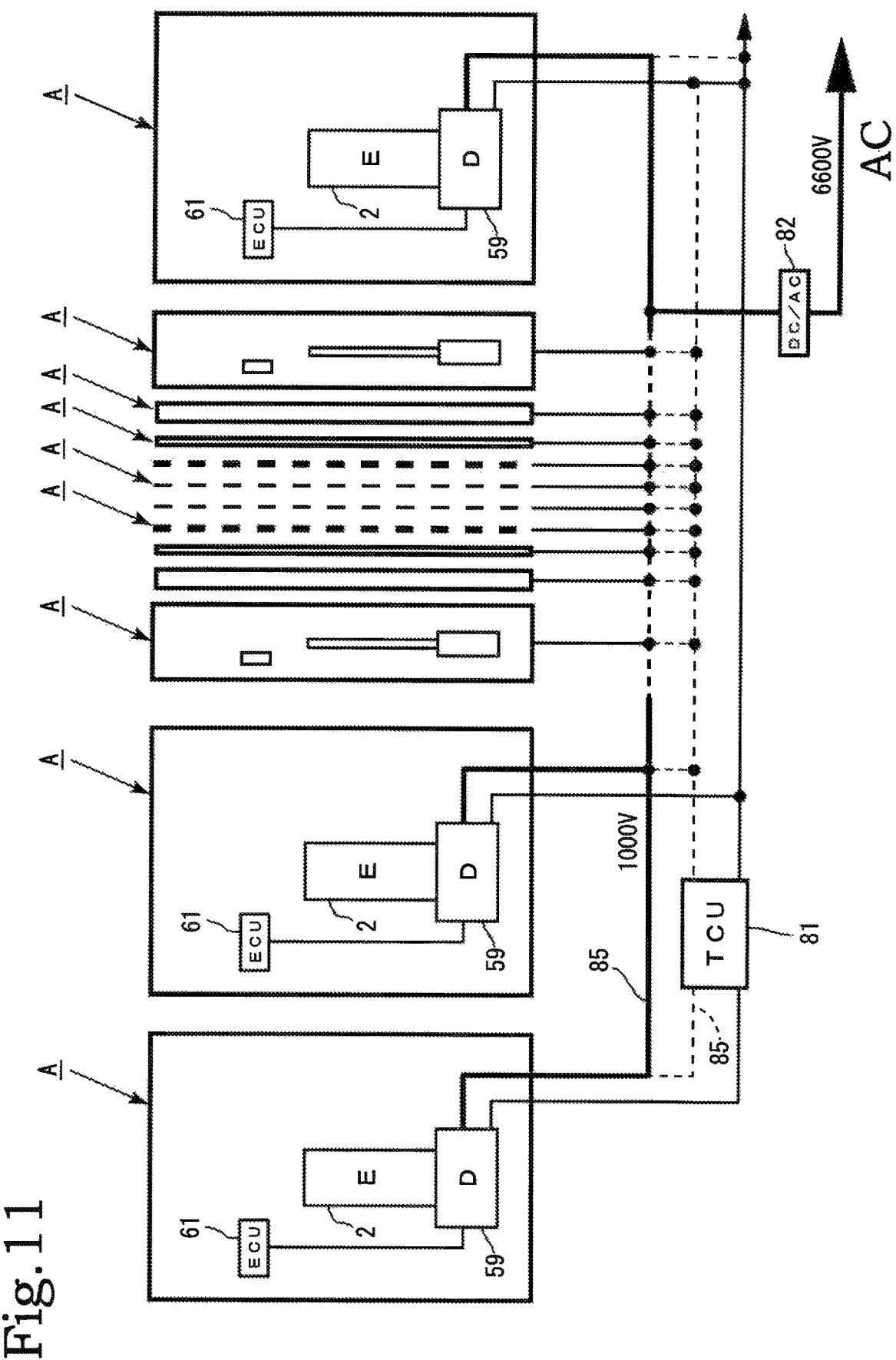
FIG. 11 is a block diagram showing another configuration of the embodiment of the present invention, and is a schematic diagram in which a large number of the power generation units (including DC generators) are used.

As next means, as shown in FIG. 11, the generator of each unit is changed to a DC generator. That is, a DC generator 59 is used. In this case, the converter is not provided in each unit, and the unit directly outputs electric power having a predetermined DC voltage. An excitation current of the DC generator of each unit is controlled with a command from the total control unit (TCU) 81 such that the voltage has a predetermined value, e.g., 1000 V. Since there is no converter, an advantage that efficiency is improved is obtained.

With regard to the above-described embodiment, the following Notes will be disclosed.

Note 1

A gas engine power generation system including: a power generation structure constituted by a gas engine, a DC generator, a cooling system portion, and an engine control unit; and a cabinet, wherein the power generation structure is housed in the cabinet, a plurality of the power generation structures are provided as power generation units, the individual power generation units are configured to be able to generate electric power independently of each other, a plurality of the power generation units are electrically coupled to each other in parallel, operation and stopping of all of the power generation units and a magnitude of generated electric power are managed by a total control unit, electric power from the individual power generation units is totalized, and it is possible to transmit appropriate AC power supply as output power supply with a DC-AC inverter.

Note 2

A gas engine power generation system including: a power generation structure constituted by a gas engine, a DC generator, a cooling system portion, an exhaust system portion, an engine control unit, and a battery; and a cabinet, wherein the power generation structure is housed in the cabinet, a plurality of the power generation structures are provided as power generation units, the individual power generation units are configured to be able to generate electric power independently of each other, a plurality of the power generation units are coupled to each other in parallel by electric wiring provided outside the power generation units, a total control unit is provided in the electric wiring, operation and stopping of all of the power generation units and a magnitude of generated electric power are managed by the total control unit, it is possible to transmit appropriate AC power supply as output power supply with a DC-AC inverter, and fuel supply in all of the power generation units is performed in fuel piping provided outside the power generation units.

Note 3

A gas engine power generation system including: a power generation structure constituted by a gas engine, a DC generator, a cooling system portion, an exhaust system portion, an engine control unit, and a battery; and a cabinet, wherein the power generation structure is housed in the cabinet, a plurality of the power generation structures are provided as power generation units, the individual power generation units are configured to be able to generate electric power independently of each other, a plurality of the power generation units are coupled to each other in parallel by electric wiring provided outside the power generation units, a total control unit is provided in the electric wiring, operation and stopping of all of the power generation units and a magnitude of generated electric power are managed by the total control unit, it is possible to transmit appropriate AC power supply as output power supply with a DC-AC inverter, fuel supply in all of the power generation units is performed in fuel piping provided outside the power generation units, and exhaust of all of the power generation units is performed by connection with an exhaust duct provided outside the power generation units.

Note 4

A gas engine power generation system including: a power generation structure constituted by a gas engine, a DC generator, a cooling system portion, an exhaust system portion, an engine control unit, and a battery; and a cabinet, wherein the power generation structure is housed in the cabinet, a plurality of the power generation structures are provided as power generation units, the individual power generation units are configured to be able to generate electric power independently of each other, a plurality of the power generation units are coupled to each other in parallel by electric wiring provided outside the power generation units, a total control unit is provided in the electric wiring, operation and stopping of all of the power generation units and a magnitude of generated electric power are managed by the total control unit, it is possible to transmit appropriate AC power supply as output power supply with a DC-AC inverter, a unit rack is provided, and the plurality of the power generation units are disposed in parallel in the unit rack.

Note 5

A gas engine power generation system including: a power generation structure constituted by a gas engine, a DC generator, a cooling system portion, an exhaust system portion, an engine control unit, and a battery; and a cabinet, wherein the power generation structure is housed in the cabinet, a plurality of the power generation structures are provided as power generation units, the individual power generation units are configured to be able to generate electric power independently of each other, a plurality of the power generation units are coupled to each other in parallel by electric wiring provided outside the power generation units, a total control unit is provided in the electric wiring, operation and stopping of all of the power generation units and a magnitude of generated electric power are managed by the total control unit, a frame in which the gas engine and the battery are installed is provided in the cabinet, and the frame is configured to be able to be taken out from and be put in the cabinet.

Note 6

A gas engine power generation system including: a power generation structure constituted by a gas engine, a DC generator, a cooling system portion, an exhaust system portion, an engine control unit, and a battery; and a cabinet, wherein the power generation structure is housed in the cabinet, a plurality of the power generation structures are provided as power generation units, the individual power generation units are configured to be able to generate electric power independently of each other, a plurality of the power generation units are coupled to each other in parallel by electric wiring provided outside the power generation units, a total control unit is provided in the electric wiring, operation and stopping of all of the power generation units and a magnitude of generated electric power are managed by the total control unit, a frame in which the gas engine and the battery are installed is provided in the cabinet, the frame is configured to be able to be taken out from and be put in the cabinet, a guide rail is provided on a floor plate of the cabinet, and a guide piece movable along the guide rail is provided on a side of a lower surface of a bottom plate of the frame.

Note 7

A gas engine power generation system including: a power generation structure constituted by a gas engine, a DC generator, a cooling system portion, an exhaust system portion, an engine control unit, and a battery; and a cabinet, wherein the power generation structure is housed in the cabinet, a plurality of the power generation structures are provided as power generation units, the individual power generation units are configured to be able to generate electric power independently of each other, a plurality of the power generation units are coupled to each other in parallel by electric wiring provided outside the power generation units, a total control unit is provided in the electric wiring, operation and stopping of all of the power generation units and a magnitude of generated electric power are managed by the total control unit, it is possible to transmit appropriate AC power supply as output power supply with a DC-AC inverter, the cabinet has a vertical two-story structure via an intermediate plate, the frame is housed in a lower room portion, and electrical equipment is housed in an upper room portion.

Note 8

A gas engine power generation system including: a power generation structure constituted by a gas engine, a DC generator, a cooling system portion, an exhaust system portion, an engine control unit, and a battery; and a cabinet, wherein the power generation structure is housed in the cabinet, a plurality of the power generation structures are provided as power generation units, the individual power generation units are configured to be able to generate electric power independently of each other, a plurality of the power generation units are coupled to each other in parallel by electric wiring provided outside the power generation units, a total control unit is provided in the electric wiring, operation and stopping of all of the power generation units and a magnitude of generated electric power are managed by the total control unit, it is possible to transmit appropriate AC power supply as output power supply with a DC-AC inverter, a unit rack is provided, the plurality of the power generation units are disposed in parallel in the unit rack, and the plurality of the power generation units are disposed on two tiers arranged vertically in the unit rack.

Note 9

A gas engine power generation system including: a power generation structure constituted by a gas engine, a DC generator, a cooling system portion, an exhaust system portion, an engine control unit, and a battery; and a cabinet, wherein the power generation structure is housed in the cabinet, a plurality of the power generation structures are provided as power generation units, the individual power generation units are configured to be able to generate electric power independently of each other, a plurality of the power generation units are coupled to each other in parallel by electric wiring provided outside the power generation units, a total control unit is provided in the electric wiring, operation and stopping of all of the power generation units and a magnitude of generated electric power are managed by the total control unit, it is possible to transmit appropriate AC power supply as output power supply with a DC-AC inverter, a unit rack is provided, the plurality of the power generation units are disposed in parallel in the unit rack, and the plurality of the power generation units are disposed on three to seven tiers in the unit rack.

Note 10

A gas engine power generation system including: a power generation structure constituted by a gas engine, a DC generator, a cooling system portion, an exhaust system portion, an engine control unit, and a battery; and a cabinet, wherein the power generation structure is housed in the cabinet, a plurality of the power generation structures are provided as power generation units, the individual power generation units are configured to be able to generate electric power independently of each other, a plurality of the power generation units are coupled to each other in parallel by electric wiring provided outside the power generation units, a total control unit is provided in the electric wiring, operation and stopping of all of the power generation units and a magnitude of generated electric power are managed by the total control unit, it is possible to transmit appropriate AC power supply as output power supply with a DC-AC inverter, a unit rack is provided, the plurality of the power generation units are disposed in parallel in the unit rack, and the plurality of the power generation units are disposed on eight to ten-odd tiers in the unit rack.

In addition, as shown in Note 1 to Note 10 (above) and FIG. 11, the invention obtained by division in the present invention is the invention related to the embodiment in which the DC generator 59 is used instead of the AC generator 51. In the case where the DC generator 59 is used, the AC-DC converter 52 becomes unnecessary (compare and see FIG. 10 and FIG. 11). With regard to this point, as described above "as shown in FIG. 11, the generator of each unit is changed to a DC generator. That is, a DC generator 59 is used. In this case, the converter is not provided in each unit, and the unit directly outputs electric power having a predetermined DC voltage.".

That is, the embodiment of the type of use of the DC generator 59 in FIG. 11 is obtained by only replacing the type of use of the AC generator 51 and the AC-DC converter 52 in FIG. 11 and FIG. 1, and a description will be made on the assumption that the other components are the same components. Accordingly, as an important matter in the present invention, as shown in FIGS. 1, 2, 4, and 10, the invention has the configuration in which the AC generator 51 and the AC-DC converter 52 are replaced by the DC generator 59, and it is assumed that the AC generator 51 and the AC-DC converter 52 are handled as the DC generator 59. This applies to the entire present description and the drawings.

REFERENCE SIGNS LIST

A Power generation unit
1 Cabinet
2 Gas engine
4 Exhaust system portion
51 AC generator
52 AC-DC converter
53 Battery
55 Cooling system portion
61 Engine control unit
81 Total control unit
83 Fuel piping
84 Exhaust collecting pipe
85 Power cable
9 Unit rack

The invention claimed is:
1. A gas engine power generation system comprising:
a power generation structure constituted by a gas engine, an AC generator, a cooling system portion, an engine control unit, and an AC-DC converter; and
a cabinet, wherein
the power generation structure is housed in the cabinet and is unitized into a power generation unit, a plurality of the power generation units which have the same configuration and compatibility are provided, the individual power generation units are configured to be able to generate electric power independently of each other, the plurality of the power generation units are electrically coupled to each other in parallel, operation and stopping of all of the power generation units and a magnitude of generated electric power are managed by a total control unit, DC power from the individual power generation units is totalized and converted to AC power, the AC power is supplied to a load side as the AC power, the engine control unit performs control by adjusting a throttle opening such that an RPM of the gas engine becomes constant against a load of power generation of the gas engine, a frame in which the gas engine and the AC generator are installed is provided in the cabinet, and the frame in which the gas engine and the AC generator are installed is configured to be able to be taken out from and be put in the cabinet.

2. The gas engine power generation system according to claim 1, wherein fuel supply in all of the power generation units is performed in fuel piping provided outside the power generation units.

3. The gas engine power generation system according to claim 1, wherein exhaust of all of the power generation units is performed by connection with an exhaust duct provided outside the power generation units.

4. The gas engine power generation system according to claim 1, further comprising:
a unit rack, wherein the plurality of the power generation units are disposed in parallel in the unit rack.

5. The gas engine power generation system according to claim 4, wherein the plurality of the power generation units are disposed on two tiers arranged vertically in the unit rack.

6. The gas engine power generation system according to claim 4, wherein the plurality of the power generation units are disposed on three to seven tiers in the unit rack.

7. The gas engine power generation system according to claim 4, wherein the plurality of the power generation units are disposed on eight to ten-odd tiers in the unit rack.

8. The gas engine power generation system according to claim 1, wherein
a guide rail is provided on a floor plate of the cabinet, and
a guide piece movable along the guide rail is provided on a side of a lower surface of a bottom plate of the frame.

9. The gas engine power generation system according to claim 1, wherein
the cabinet has a vertical two-story structure via an intermediate plate, the frame is housed in a lower room portion, and electrical equipment is housed in an upper room portion.

10. A gas engine power generation system comprising:
a power generation structure constituted by a gas engine, a DC generator, a cooling system portion, and an engine control unit; and
a cabinet, wherein
the power generation structure is housed in the cabinet and is unitized into a power generation unit, a plurality of the power generation units which have the same configuration and compatibility are provided, the individual power generation units are configured to be able to generate electric power independently of each other, the plurality of the power generation units are electrically coupled to each other in parallel, operation and stopping of all of the power generation units and a magnitude of generated electric power are managed by a total control unit, DC power from the individual power generation units is totalized and converted to AC power, the AC power is supplied to a load side as the AC power, the engine control unit performs control by adjusting a throttle opening such that an RPM of the gas engine becomes constant against a load of power generation of the gas engine, a frame in which the gas engine and the DC generator are installed is provided in the cabinet, and the frame in which the gas engine and the DC generator are installed is configured to be able to be taken out from and be put in the cabinet.

11. The gas engine power generation system according to claim 10, wherein fuel supply in all of the power generation units is performed in fuel piping provided outside the power generation units.

12. The gas engine power generation system according to claim 10, wherein exhaust of all of the power generation units is performed by connection with an exhaust duct provided outside the power generation units.

13. The gas engine power generation system according to claim 10, further comprising:
a unit rack, wherein the plurality of the power generation units are disposed in parallel in the unit rack.

14. The gas engine power generation system according to claim 13, wherein the plurality of the power generation units are disposed on two tiers arranged vertically in the unit rack.

15. The gas engine power generation system according to claim 13, wherein the plurality of the power generation units are disposed on three to seven tiers in the unit rack.

16. The gas engine power generation system according to claim 13, wherein the plurality of the power generation units are disposed on eight to ten-odd tiers in the unit rack.

17. The gas engine power generation system according to claim 10, wherein
a guide rail is provided on a floor plate of the cabinet, and
a guide piece movable along the guide rail is provided on a side of a lower surface of a bottom plate of the frame.

18. The gas engine power generation system according to claim 10, wherein
the cabinet has a vertical two-story structure via an intermediate plate, the frame is housed in a lower room portion, and electrical equipment is housed in an upper room portion.

* * * * *